United States Patent
Magasweran et al.

(10) Patent No.: US 12,423,209 B1
(45) Date of Patent: Sep. 23, 2025

(54) OPTIMIZED ML MODEL LOADING USING PREDICTED USAGE AND DEVICE STATE

(71) Applicants: Lucas Rangit Magasweran, Berlin (DE); Piotr Gurgul, Hergiswil (CH)

(72) Inventors: Lucas Rangit Magasweran, Berlin (DE); Piotr Gurgul, Hergiswil (CH)

(73) Assignee: Snap Inc., Santa Monica, CA (US)

( * ) Notice: Subject to any disclaimer, the term of this patent is extended or adjusted under 35 U.S.C. 154(b) by 490 days.

(21) Appl. No.: 18/076,497

(22) Filed: Dec. 7, 2022

Related U.S. Application Data

(60) Provisional application No. 63/295,690, filed on Dec. 31, 2021.

(51) Int. Cl.
*G06F 11/34* (2006.01)
*G06F 12/02* (2006.01)

(52) U.S. Cl.
CPC ...... *G06F 11/3442* (2013.01); *G06F 12/0246* (2013.01)

(58) Field of Classification Search
CPC .......................... G06F 11/3442; G06F 12/0246
See application file for complete search history.

(56) References Cited

U.S. PATENT DOCUMENTS

| | | | | |
|---|---|---|---|---|
| 2018/0331885 | A1* | 11/2018 | Raymond | H04L 41/0897 |
| 2019/0209022 | A1* | 7/2019 | Sobol | G08B 21/0272 |
| 2020/0104039 | A1* | 4/2020 | Robertson | G02B 27/017 |
| 2020/0211170 | A1* | 7/2020 | Coria Mendoza | H04N 23/64 |
| 2021/0174249 | A1* | 6/2021 | Hernandez Herranz | G06N 20/00 |
| 2021/0319894 | A1* | 10/2021 | Sobol | G16H 20/30 |
| 2021/0357259 | A1* | 11/2021 | Gan | G06F 9/5094 |
| 2021/0410029 | A1* | 12/2021 | Farag | H04L 41/147 |
| 2022/0319606 | A1* | 10/2022 | Sarpatwari | G06N 3/08 |
| 2023/0132041 | A1* | 4/2023 | Olwal | G06F 3/012 340/573.1 |
| 2023/0177441 | A1* | 6/2023 | Durvasula | G06N 3/08 706/45 |
| 2024/0378079 | A1* | 11/2024 | Shami | G06F 9/5038 |
| 2024/0412720 | A1* | 12/2024 | Vasylyev | G06F 16/90332 |

* cited by examiner

*Primary Examiner* — Benjamin C Wu
(74) *Attorney, Agent, or Firm* — CM Law; Stephen J. Weed

(57) ABSTRACT

Loading and unloading of ML models into an ML model cache or system memory of an electronic eyewear device is managed based on which applications are active or available and predicted activities. Sensor inputs are processed to detect whether the electronic eyewear device has moved or is predicted to move and new ML models are downloaded based on updated location information or observable visual information. Sensor inputs are also processed to determine whether the electronic eyewear device has changed state or resource availability and whether the ML model cache or system memory needs to be resized to accommodate new ML models for the changed conditions. If so, stored ML models are updated to reflect the new device state by unloading an ML model, receiving a new ML model based on the changed state or resource availability and a processing priority of the new ML model, or both.

20 Claims, 16 Drawing Sheets

Scenario 1 : Device Status Change

Scenario 2 : Connection Status Change

Scenario 5 : Prediction Based on Geospatial Proximity

Scenario 6 : Prediction Based on User Behavior

OPTIMIZED ML MODEL LOADING USING PREDICTED USAGE AND DEVICE STATE

CROSS-REFERENCE TO RELATED APPLICATIONS

This application claims priority to U.S. Provisional Application Ser. No. 63/295,690 filed on Dec. 31, 2021, the contents of which are incorporated fully herein by reference.

TECHNICAL FIELD

Examples set forth in the present disclosure relate to systems and methods for providing machine learning models to portable electronic devices, including wearable electronic devices such as smart glasses. More particularly, but not by way of limitation, the present disclosure describes systems and methods for managing the loading of machine learning models into portable electronic devices based on location, system state, and resource availability.

BACKGROUND

Wearable electronic devices such as electronic eyewear devices may communicate with application programs running on mobile devices such as a user's mobile computing device and, in some cases, may communicate directly with a server. In either case, the electronic eyewear device may support direct device integration with communication application backend services as well as third-party application programming interfaces (APIs) to services such as text-to-speech, object recognition, and other services that may incorporate machine learning models. The wearer of the electronic eyewear devices may select display features through interaction with the electronic eyewear device.

Electronic eyewear devices are resource (i.e., memory, storage, power) constrained devices and latency sensitive. They are used in various environments (e.g., sitting indoors versus riding a bicycle outdoors) and must run their algorithms efficiently. Available memory can differ dramatically depending on the device state and whether capturing or transcoding is active. Electronic eyewear devices must be highly optimized for low latency to prevent motion sickness, etc. Electronic eyewear devices also need to be configured to maximize on-device performance in environments where Internet connectivity is not guaranteed.

Machine Learning (ML) is used to analyze image streams (e.g., surface classification), audio streams (e.g., voice control, transcription), and sensor streams (e.g., activity recognition, health monitoring, pedestrian dead reckoning (PDR), etc.). Different ML models may be used for different applications.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
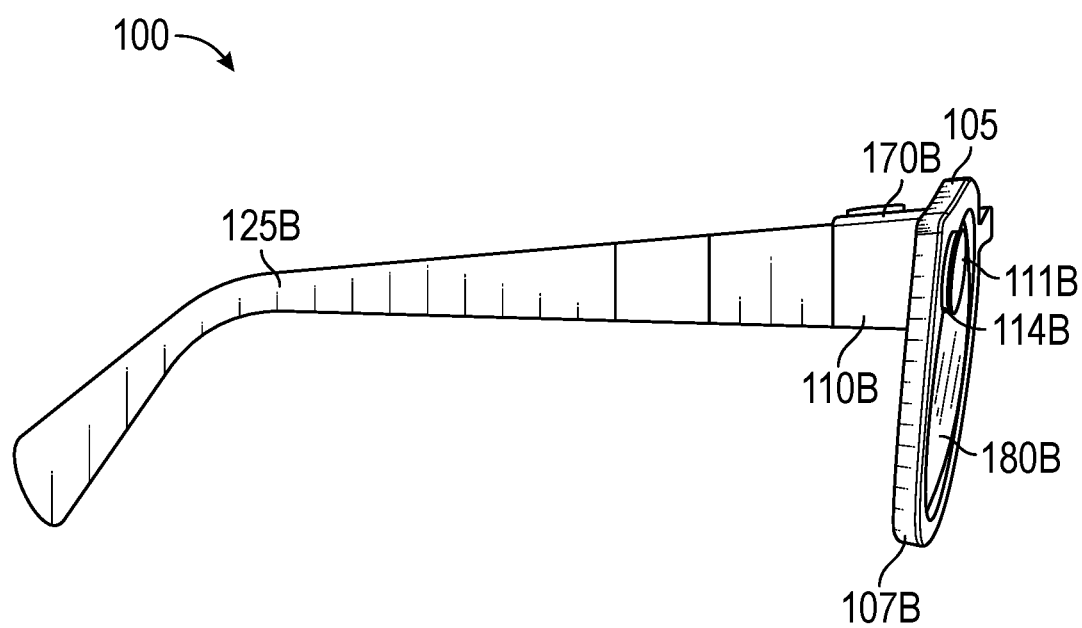
FIG. 1A illustrates a side view of an example hardware configuration of an electronic eyewear device showing a right optical assembly with an image display.

Techniques for Machine Learning (ML) model management are provided for a resource-constrained device such as an electronic eyewear device (e.g., SPECTACLES® available from Snap, Inc. of Santa Monica, CA) that may have a limited amount of operating memory and only intermittent access to WI-FI®. This leads to a tradeoff between ML model availability, accuracy and performance. The ML model management techniques take into account the device state (network availability, memory use, etc.) and the user's geolocation info (heading, location, geographical features nearby) in order to make an optimal decision regarding which ML model(s) should be loaded into memory.

This disclosure is directed to systems and methods for loading and unloading of ML models into an ML model cache or system memory of an electronic eyewear device. The loading and unloading is managed based on which applications are active or available and predicted activities of the electronic eyewear device. Sensor inputs are processed to detect whether the electronic eyewear device has moved or is predicted to move (e.g., based on what is already visible in front of the electronic eyewear device) and a new ML model is downloaded based on at least one of updated location information or observable visual information. Sensor inputs are also processed to determine whether the electronic eyewear device has changed state or resource availability and whether the ML model cache or system memory needs to be resized to accommodate any new ML models for the changed conditions. If so, stored ML models are updated to reflect the new device state by unloading an ML model, receiving a new ML model based on the changed state or resource availability and a processing priority of the new ML model, or both.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device and associated management system for managing the loading of ML models into the electronic eyewear devices will be described with respect to FIGS. 1-15.

The system described herein includes three main hardware components: an electronic eyewear device, a mobile device, and a server. The electronic eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the electronic eyewear device and mobile device, as well as examples of system operation, will be described with respect to FIGS. 7-15. However, it will be appreciated that the mobile device, the server, or both may be removed from the system provided the electronic eyewear device is adapted to include sufficient processing and storage capabilities to perform the described functions of the mobile device, the server, or both.

Electronic Eyewear Device

In sample configurations, electronic eyewear devices with augmented reality (AR) capability are used in the systems described herein. Electronic eyewear devices are desirable to use in the system described herein as such devices are scalable, customizable to enable personalized experiences, enable effects to be applied anytime, anywhere, and ensure user privacy by enabling only the wearer to see the transmitted information. An electronic eyewear device such as SPECTACLES® available from Snap, Inc. of Santa Monica, California, may be used without any specialized hardware in a sample configuration.

Figure 2A:
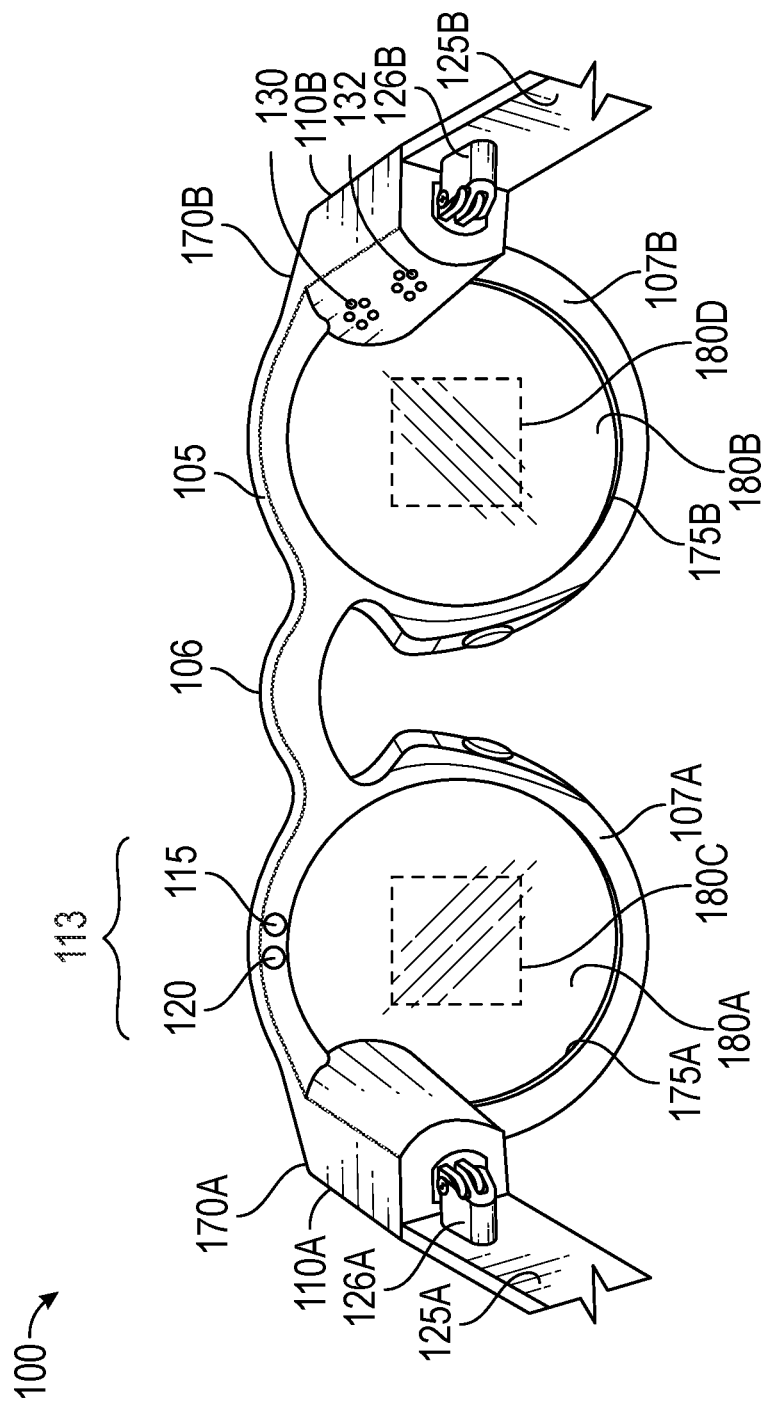
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 3) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 412 of FIG. 4) for digital processing along with a timestamp in which the image of the scene is captured. Image processor 412 may include circuitry to receive signals from the visible light camera 114A-B and to process those signals from the visible light cameras 114A-B into a format suitable for storage in the memory (element 434 of FIG. 4). The timestamp may be added by the image processor 412 or other processor that controls operation of the visible light cameras 114A-B. Visible light cameras 114A-B allow the stereo camera to simulate human binocular vision. Stereo cameras also provide the ability to reproduce three-dimensional images (image 315 of FIG. 3) based on two captured images (elements 358A-B of FIG. 3) from the visible light cameras 114A-B, respectively, having the same timestamp. Such three-dimensional images 315 allow for an immersive lifelike experience, e.g., for virtual reality or video gaming. For stereoscopic vision, the pair of images 358A-B may be generated at a given moment in time-one image for each of the left and right visible light cameras 114A-B. When the pair of generated images 358A-B from the frontward facing field of view (FOV) 111A-B of the left and right visible light cameras 114A-B are stitched together (e.g., by the image processor 412), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 432 (FIG. 4) is coupled to the electronic eyewear device 100 and connected to the visible light cameras 114A-B and memory 434 (FIG. 4) accessible to the processor 432, and programming in the memory 434 may be provided in the electronic eyewear device 100 itself.

Figure 1B:
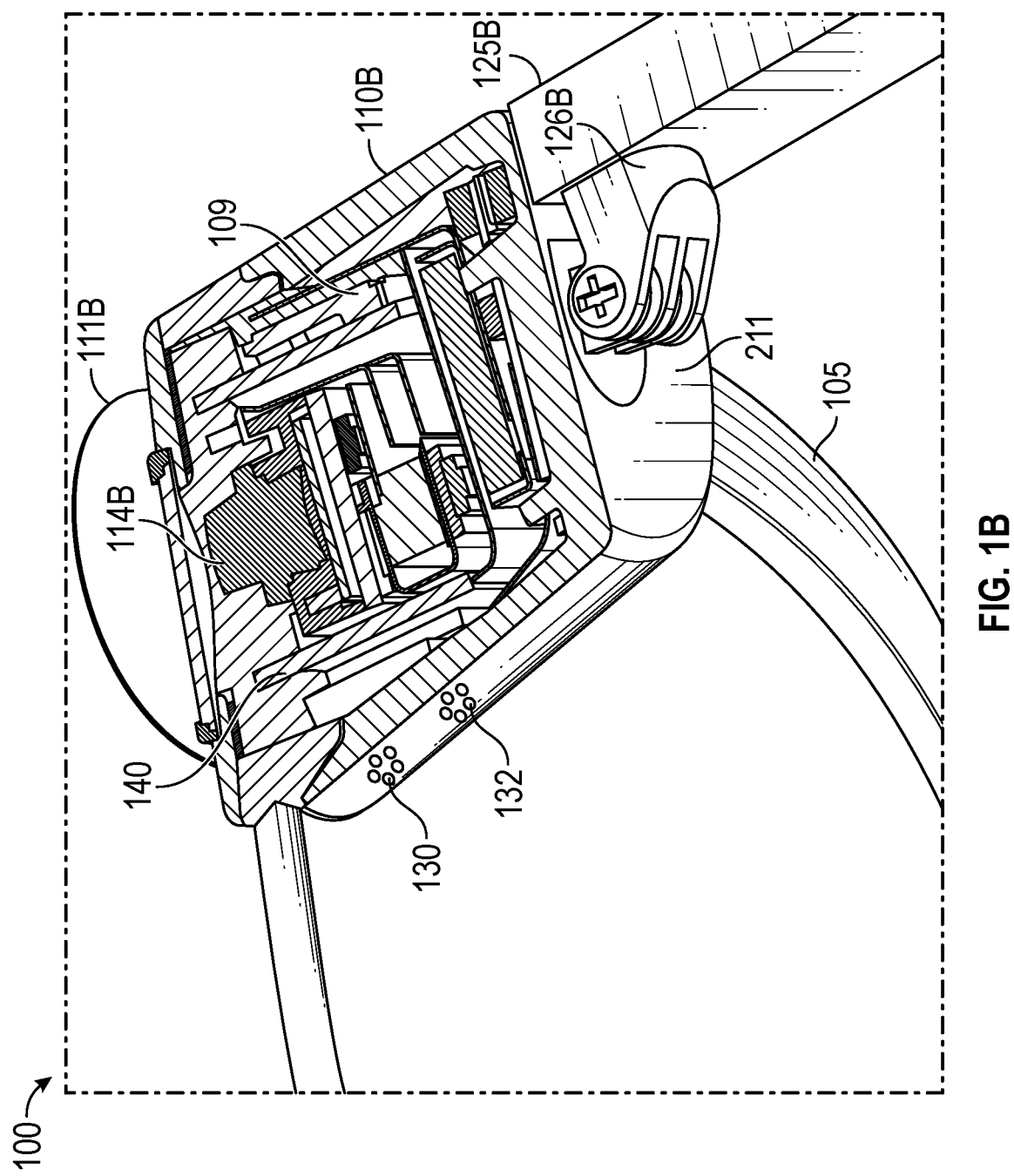
FIG. 1B illustrates a top cross-sectional view of a temple of the electronic eyewear device of FIG. 1A.
Figure 2B:
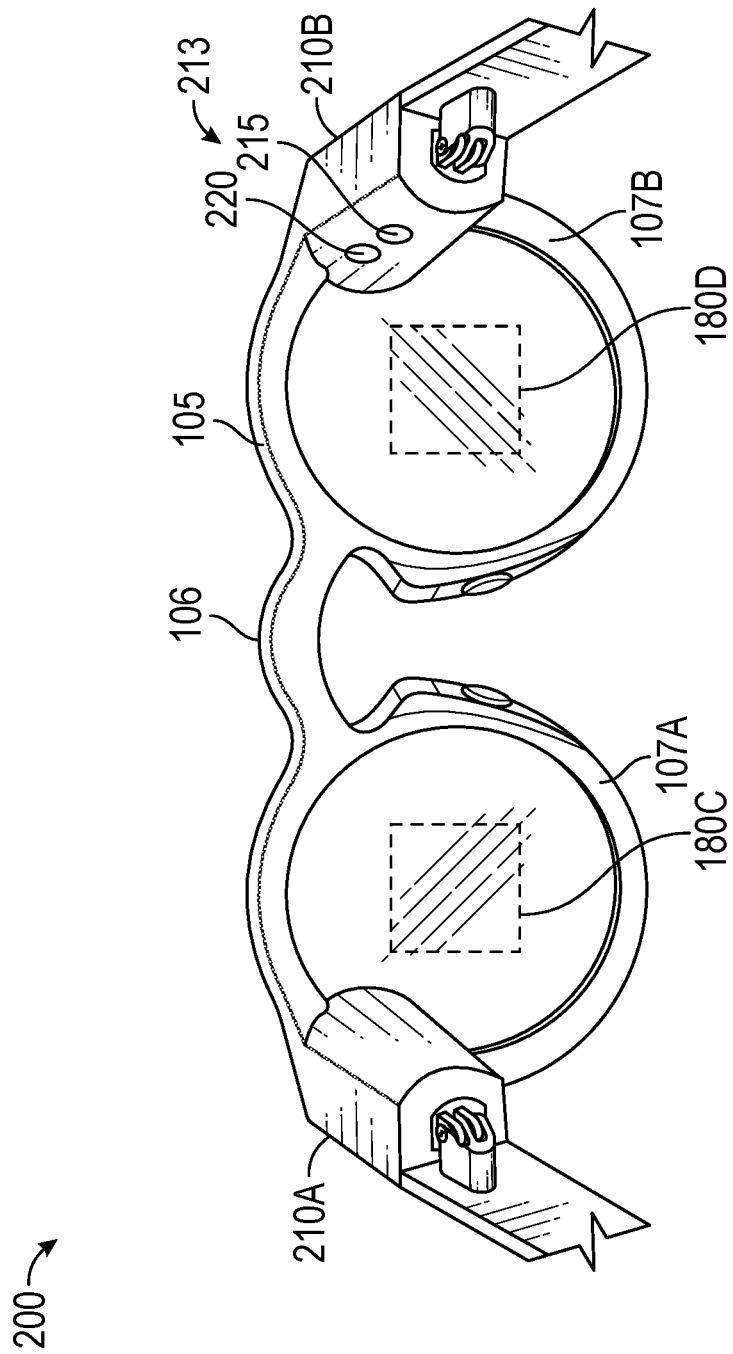
FIG. 2B illustrates a rear view of an example hardware configuration of another electronic eyewear device in an example hardware configuration.
Figure 2C:
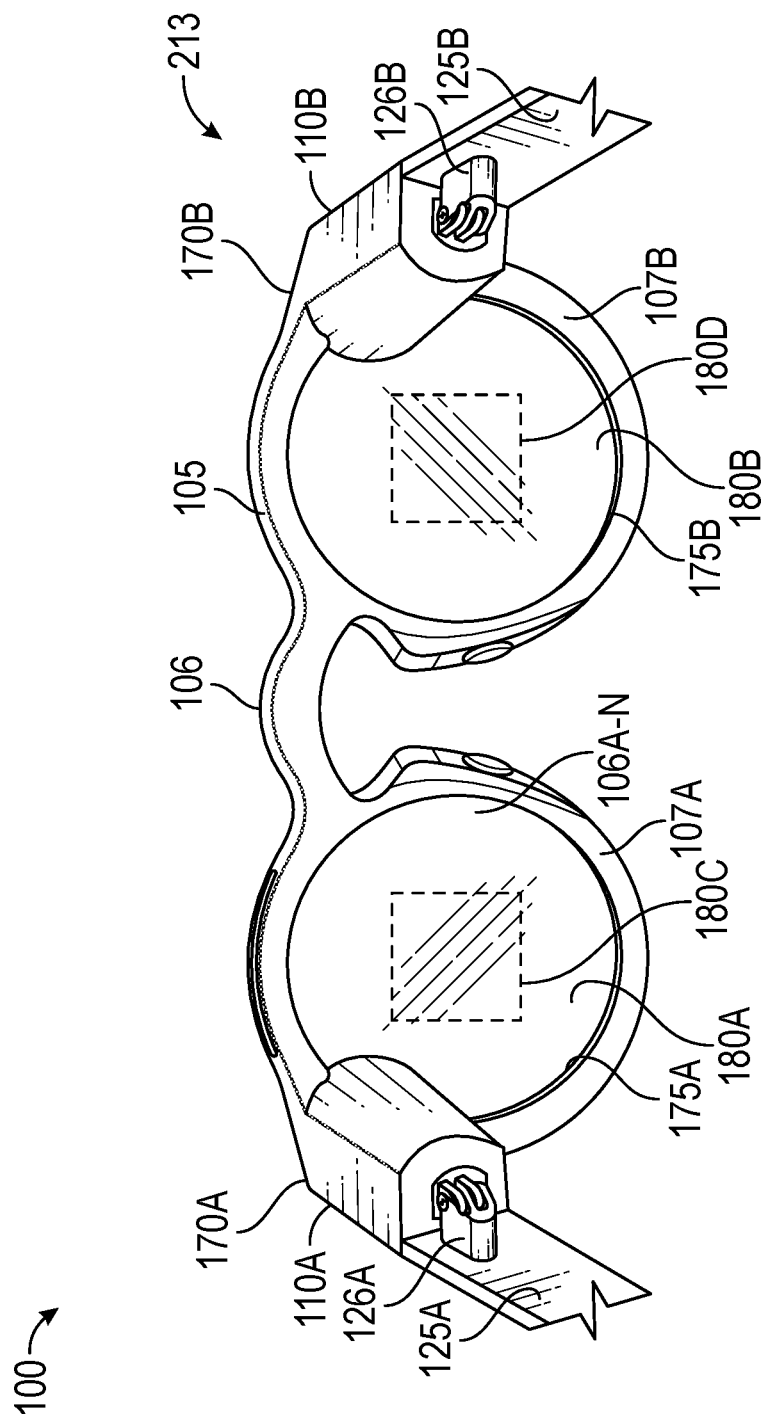
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 442 of FIG. 4) coupled to the see-through image displays 180C-D of optical assembly 180A-B to control the image displays 180C-D of optical assembly 180A-B to present the sequence of displayed images 315, which are described in further detail below. Electronic eyewear device 100 may further include the memory 434 and the processor 432 having access to the image display driver 442 and the memory 434, as well as programming in the memory 434. Execution of the programming by the processor 432 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 432 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the electronic eyewear device 100 to generate a successive displayed image of the sequence of displayed images based on the field of view adjustment. Execution of the programming by the processor 432 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis). or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
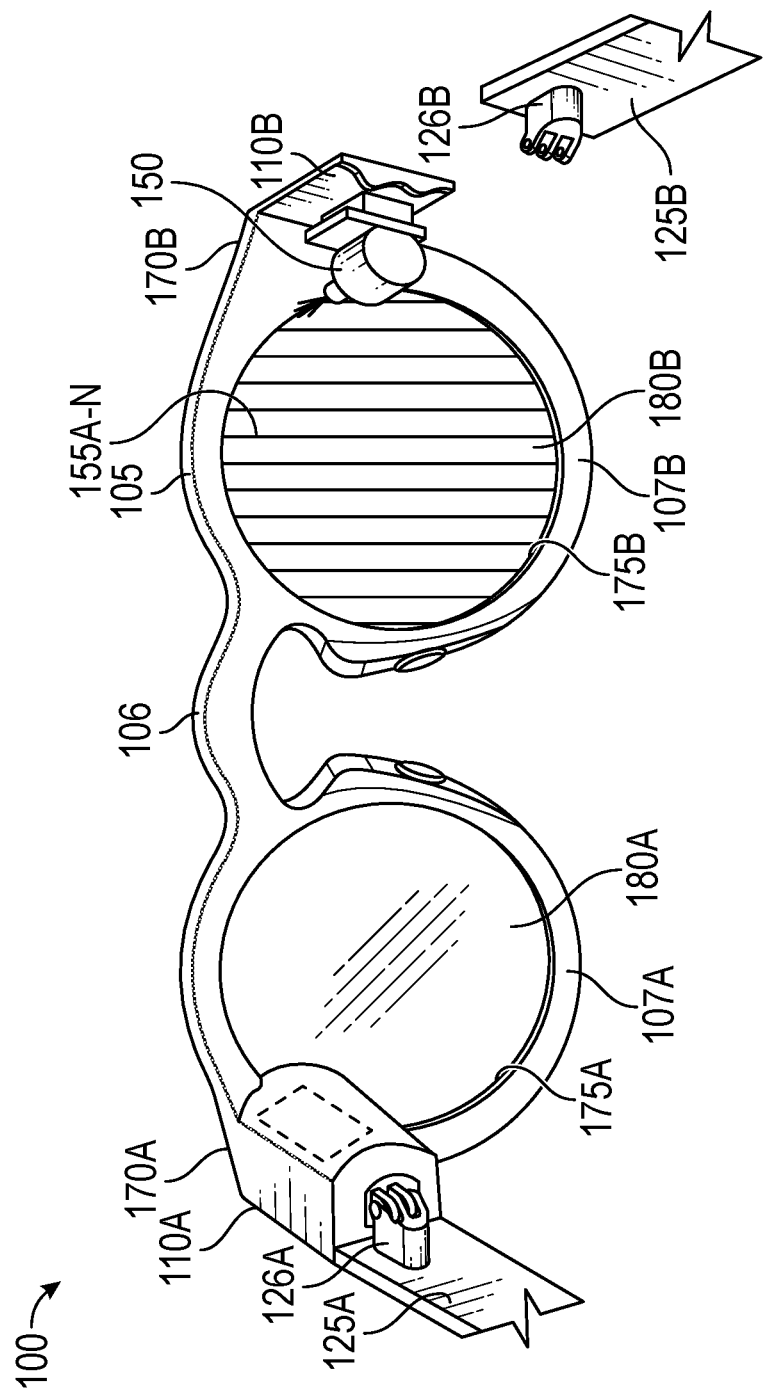

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180A-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips 155A-N' and a projector 150A (not shown) in left temple 110A). The second optical assembly 180B may include the second see-through image display 180D (e.g., a display matrix of FIG. 2C or optical strips 155A-N" and a projector 150B (shown as projector 150) in right temple 110B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
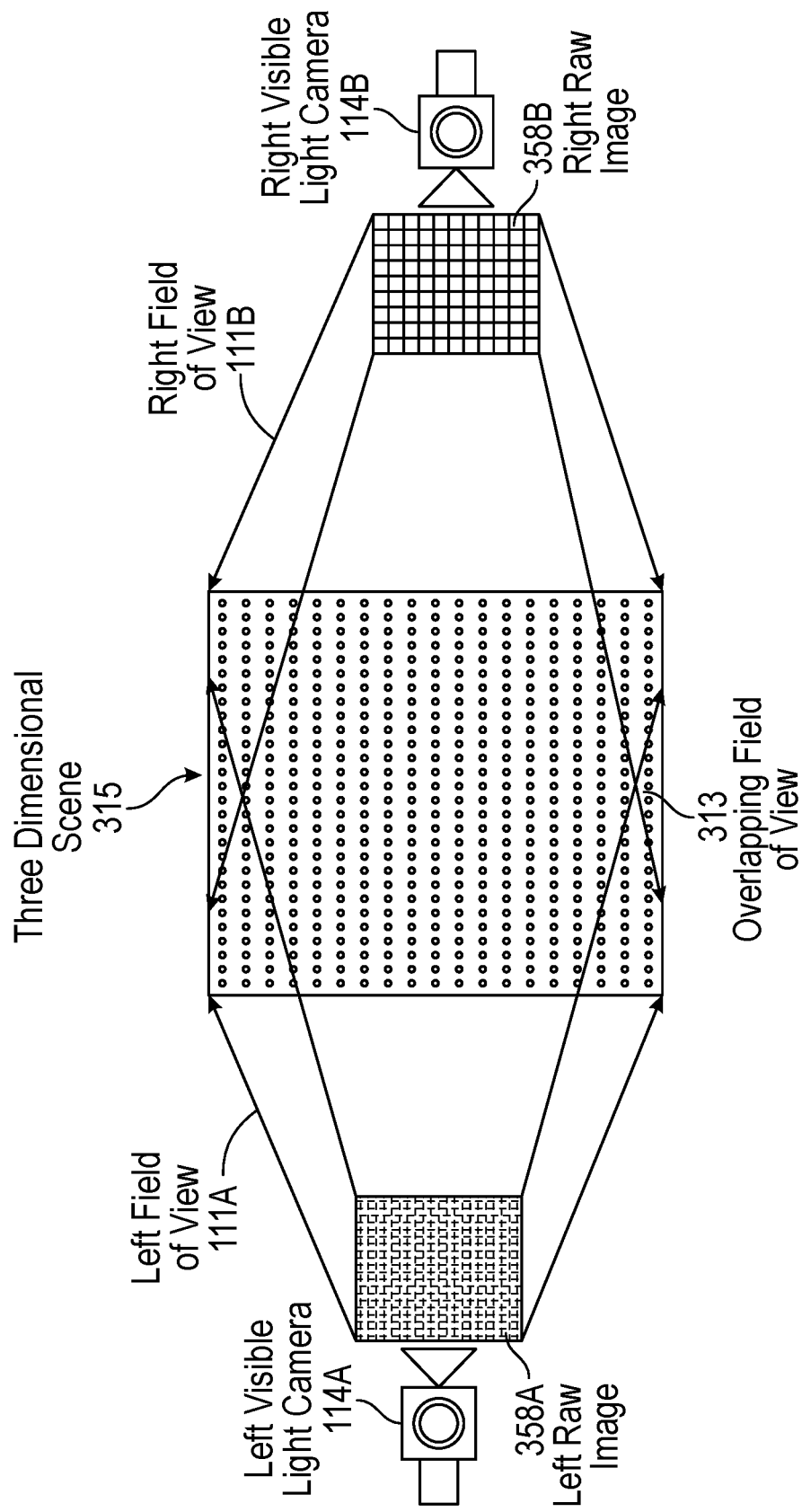
FIG. 3 illustrates an example of visible light captured by the left visible light camera as a left raw image and visible light captured by the right visible light camera as a right raw image.
Figure 4:
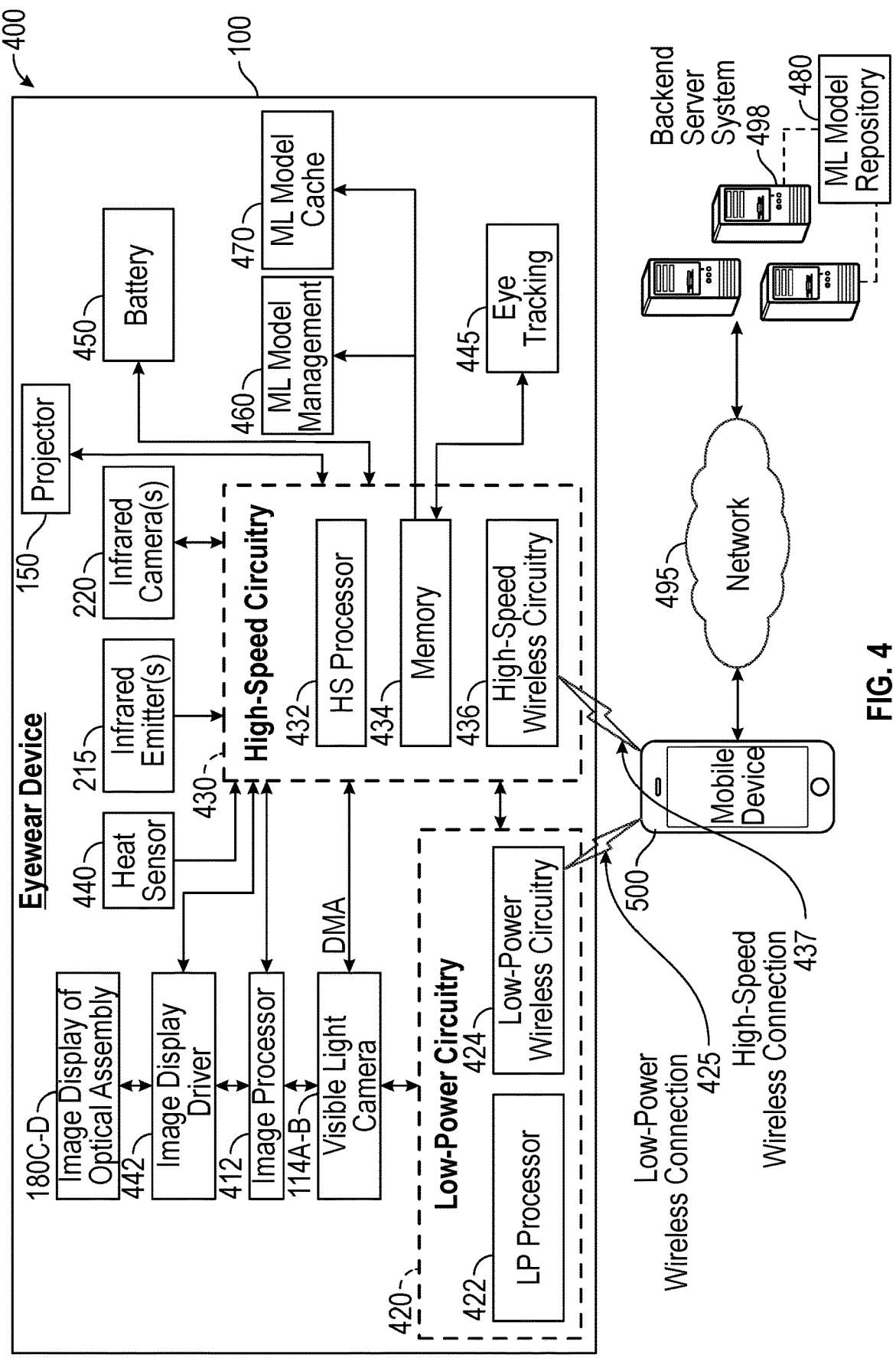
FIG. 4 illustrates a block diagram of electronic components of the electronic eyewear device in a system that includes loaded machine learning models in a sample configuration.

FIG. 3 illustrates an example of capturing visible light with cameras 114A-B. Visible light is captured by the left visible light camera 114A with a round field of view (FOV). 111A. A chosen rectangular left raw image 358A is used for image processing by image processor 412 (FIG. 4). Visible light is also captured by the right visible light camera 114B with a round FOV 111B. A rectangular right raw image 358B chosen by the image processor 412 is used for image processing by processor 412. Based on processing of the left raw image 358A and the right raw image 358B having an overlapping field of view 313, a three-dimensional image 315 of a three-dimensional scene, referred to hereafter as an immersive image, is generated by processor 412 and displayed by displays 180C and 180D and which is viewable by the user.

FIG. 4 illustrates a high-level functional block diagram 400 including example electronic components disposed in electronic eyewear device 100 or 200. The illustrated electronic components include the processor 432, the memory 434, and the see-through image display 180C and 180D.

Memory 434 includes instructions for execution by processor 432 to implement the functionality of electronic eyewear devices 100 and 200, including instructions for processor 432 to control in the image 315. Such functionality may be implemented by processing instructions of eye tracking software 445, ML model management software 460, and an ML model cache 470 that is stored in memory 434 and executed by high speed processor 432. Processor 432 receives power from battery 450 and executes the instructions stored in memory 434, or integrated with the processor 432 on-chip, to perform the functionality of electronic eyewear devices 100 and 200 and to communicate with external devices via wireless connections.

The electronic eyewear devices 100 and 200 may incorporate an eye movement tracker 445 (e.g., shown as infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the electronic eyewear devices 100 or 200 using both a low-power wireless connection 425 and a high-speed wireless connection 437. Mobile device 500 is further connected to server system 498 via a network 495. The network 495 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 442, image processor 412, low-power circuitry 420, and high-speed circuitry 430. The components shown in FIG. 4 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 442 to present the sequence of displayed images, including the initial displayed image with the initial field of view and the successive displayed image with the successive field of view.

The ML model management software 460 and ML model cache 470 will be described in further detail below with respect to FIGS. 7-15.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the left and right image displays 180C-D of the optical assembly 180A-B. High-speed processor 432 may be any processor capable of managing high-speed communications and operation of any general computing system needed for electronic eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the electronic eyewear device 100 or 200 and the operating system is stored in memory 434 for execution. In addition to any other responsibilities, the high-speed processor 432 executing a software architecture for the electronic eyewear device 100 or 200 is used to manage data transfers with high-speed wireless circuitry 436. In certain examples, high-speed wireless circuitry 436 is configured to implement Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the electronic eyewear devices 100 and 200 can include short range transceivers (BLUETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the electronic eyewear device 100 and 200, as can other elements of network 495.

Memory 434 includes any storage device capable of storing various data and applications, including, among other things, color maps, camera data generated by the left and right visible light cameras 114A-B and the image processor 412, as well as images generated for display by the image display driver 442 on the see-through image displays 180C-D of the optical assembly 180A-B. While memory 434 is shown as integrated with high-speed circuitry 430, in other examples, memory 434 may be an independent stand-alone element of the electronic eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 500 and electronic eyewear devices 100 and 200. Electronic eyewear devices 100 and 200 may be connected with a host computer. For example, the electronic eyewear devices 100 or 200 may be paired with the mobile device 500 via the high-speed wireless connection 437 or connected to the server system 498 via the network 495. Also, as explained in more detail below with respect to FIGS. 7-15, an ML model repository 480 may be maintained by the backend server system 498 for use in updating the ML models on the electronic eyewear devices 100 or 200.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 442. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 440, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Mobile Device

Figure 5:
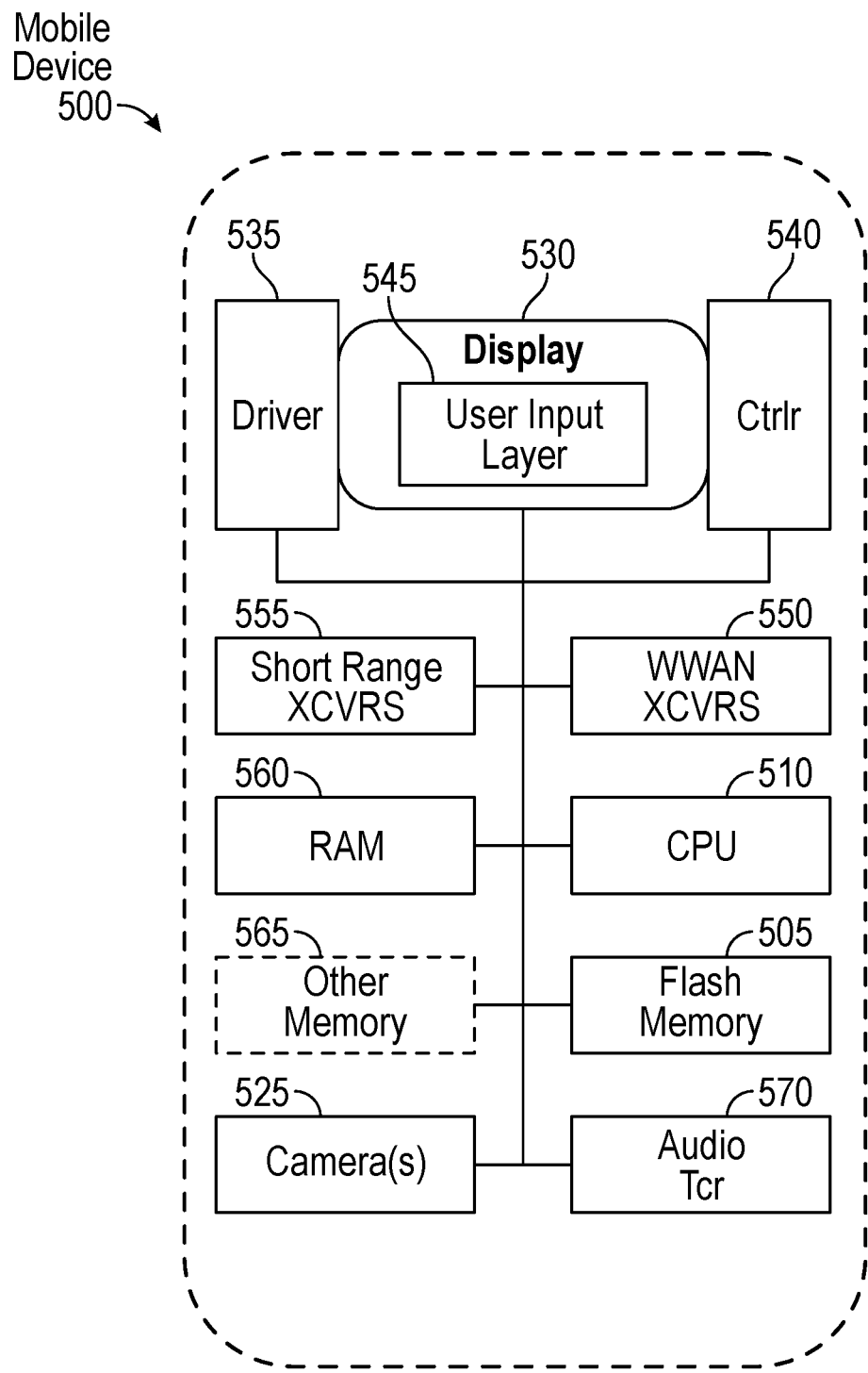
FIG. 5 illustrates a block diagram of electronic components of a mobile device adapted for use with system of FIG. 4.

FIG. 5 illustrates a sample configuration of a mobile device 500 adapted to manage usage of machine learning models in sample configurations. In particular, FIG. 5 is a high-level functional block diagram of an example mobile device 500 that a user may use to manage usage of machine learning models as described herein. Mobile device 500 may include a flash memory 505 that stores programming to be executed by the CPU 510 to perform all or a subset of the functions described herein. The mobile device 500 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, Bluetooth™, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or Bluetooth™ based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hard-wired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

Backend Server System

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 6:
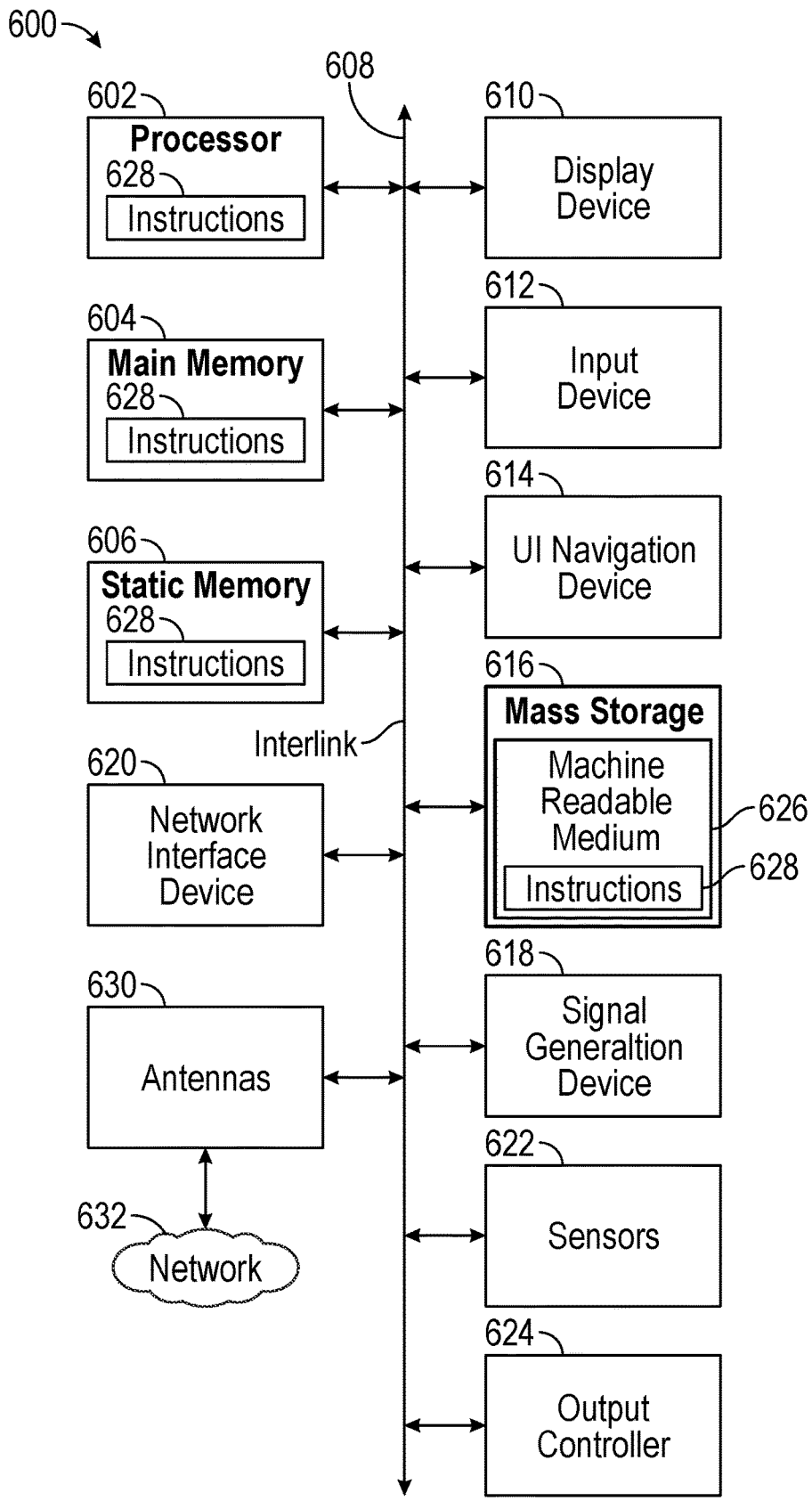
FIG. 6 illustrates a sample configuration of a computer system adapted to implement the server of the system of FIG. 4 in a sample configuration.

FIG. 6 illustrates a sample configuration of a computer system adapted to implement the systems and methods described herein. In particular, FIG. 6 illustrates a block diagram of an example of a machine 600 upon which one or more configurations of the backend server system 498 (FIG. 4) may be implemented. As described herein, the backend server system 498 may execute instructions for downloading and managing ML models as described herein. For example, the backend server system 498 may maintain the ML model repository 480. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may implement the methods described herein by running the software used to implement the features for controlling IoT devices as described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

While the machine readable medium 626 is illustrated as a single medium, the term "machine readable medium" may include a single medium or multiple media (e.g., at least one of a centralized or distributed database, or associated caches and servers) configured to store the one or more instructions 628. The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the elements shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Optimized ML Model Loading

In sample configurations, the system described above is adapted to load ML models that are optimized for the user's surroundings, predicted behavior, system state, and resource availability. The ML models may be selected up front based on their application. To improve processing efficiency, the selected ML models are stored on the electronic eyewear device 100 or 200 locally and include a management system that predicts which ML models are most likely to be needed based on the user's surroundings and predicted behavior. The management system preloads or unloads the ML models based on the user's surroundings, predicted behavior, system state, and resource availability. For example, user intention may be predicted not only by location and movement, but also by what is already visible in front of the electronic eyewear device 100. The management system uses a 3-tier ML model storage including remote, on device, and in-memory. Depending on geospatial information such as the surroundings and predicted behavior (e.g., the wearer is at work and then driving home, or the user is at home on the weekend and then running in the park), the specialized ML model selection is performed in order to reduce computation resources while maximizing accuracy. Depending on usage and state of the device (e.g., capture, backup, etc.) or memory resource heavy operations, a further specialized ML model is loaded into memory on-demand when usage indicates that the specific model may be useful for optimal accuracy.

Figure 7:
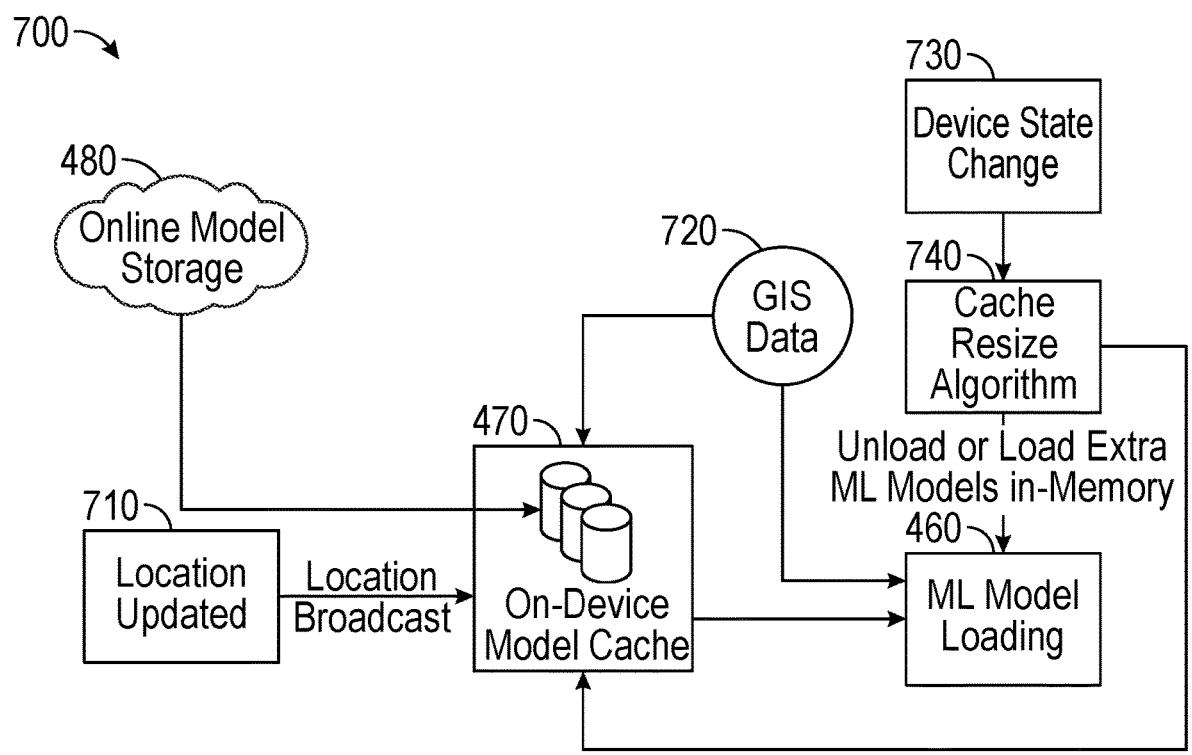
FIG. 7 illustrates a management system for managing the ML models implemented on an electronic eyewear device in a sample configuration.

FIG. 7 illustrates a management system 700 for managing the ML models implemented on an electronic eyewear device 100 or 200 in a sample configuration. As illustrated, an on-device model cache 470 (FIG. 4) stores ML models from ML model repository 480 that are downloaded based on the user's surroundings, predicted or actual movement or behavior, and current device conditions (including system state and resource availability). Sensors 710 on at least one of the electronic eyewear device 100 or 200 or the mobile device 500 may provide updated location information for use by the ML model loading management system 460 in selecting which ML model to load based on at least the updated location information. The model may also be updated based on observable visual information presented on the display of the electronic eyewear device 100 or 200 as predictive of actions to be taken by the wearer. Geographical Information System (GIS) data 720 is provided to the on-device model cache 470 to determine how to map the GIS data 720 to scene models. The GIS data 720 also may be provided to the ML model loading management system 460 for use in determining which ML model to load. In addition, device state change data 730 may also be provided to a cache resize algorithm 740 to determine whether it has become necessary due to current processing to unload ML models from the on-device model cache 470 or to load extra ML models into the on-device model cache 470. This information also may be provided to the ML model loading management system 460 for use in selecting which ML model to load or unload based on established priorities for the stored ML models.

Figure 8:
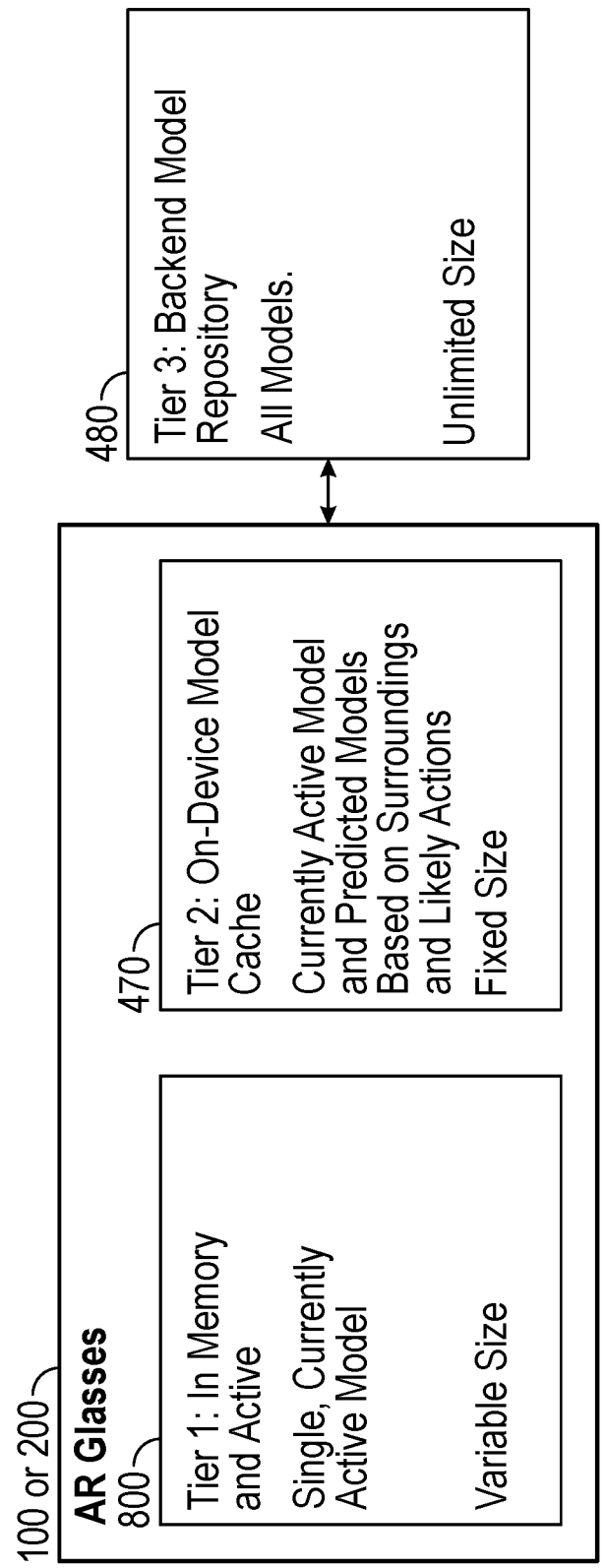
FIG. 8 illustrates sample memory tiers for swapping ML models in a sample configuration.

In sample configurations, the ML management model includes at least three buckets/tiers, with the tier 1 bucket (in-memory) being of variable size. FIG. 8 illustrates sample memory tiers for swapping ML models in an electronic eyewear device 100 or 200. In the example of FIG. 8, the electronic eyewear device 100 or 200 includes the first two memory tiers, namely, Tier 1 (800) including the ML models that are in-memory and active. Tier 1 may have a variable size and typically stores a single, currently active ML model that is being used or has been most recently used by the processor (e.g., processor 432) of the electronic eyewear device 100 or 200. Tier 2 includes the on-device model cache 470 including the currently active ML model as well as predicted models based on the surroundings and likely actions of the user. Factors that impact the size of the Tier 1 memory may include available Random Access Memory (RAM) and recording state (e.g., image capturing, transcoding, saving, etc.). On the other hand, the Tier 2 on-device model cache 470 is typically of a fixed size, and the ML models are stored on a priority basis in accordance with the priorities of usage of the respective ML models. For example, as the cache resize algorithm 740 determines that it has become necessary to unload ML models or to load extra ML models, the lowest priority ML models are unloaded and the highest priority ML models are loaded into the on-device model cache 470. The third memory tier (Tier 3) is typically not stored on the electronic eyewear device 100 or 200 but is instead stored in the backend ML model repository 480 of the backend server system 498. All available ML models may be stored in the backend server's ML model repository 480 (e.g., SPECTACLES® backend services) for loading into the on-device ML model cache 470 via an Internet connection 495 as needed.

Depending on geospatial information such as the surroundings and predicted behavior (e.g., at work then driving home, at home on the weekend then running in the park), the ML model selection is performed in order to reduce computation resources while maintaining accuracy. For example, depending on usage of the electronic eyewear device 100 of 200 (e.g., image capture, backup, etc.) or memory resource heavy operations, a further limited-in-size and specialized ML model from the ML model repository 480 may be loaded into the on-device model cache 470.

The loading and unloading of ML models into/from the on-device model cache 470 depends on a number of factors. To understand the use case criteria for changing the ML model in sample configurations, sample use case criteria will be illustrated by way of the scenarios illustrated in FIGS. 9-14.

Figure 9:
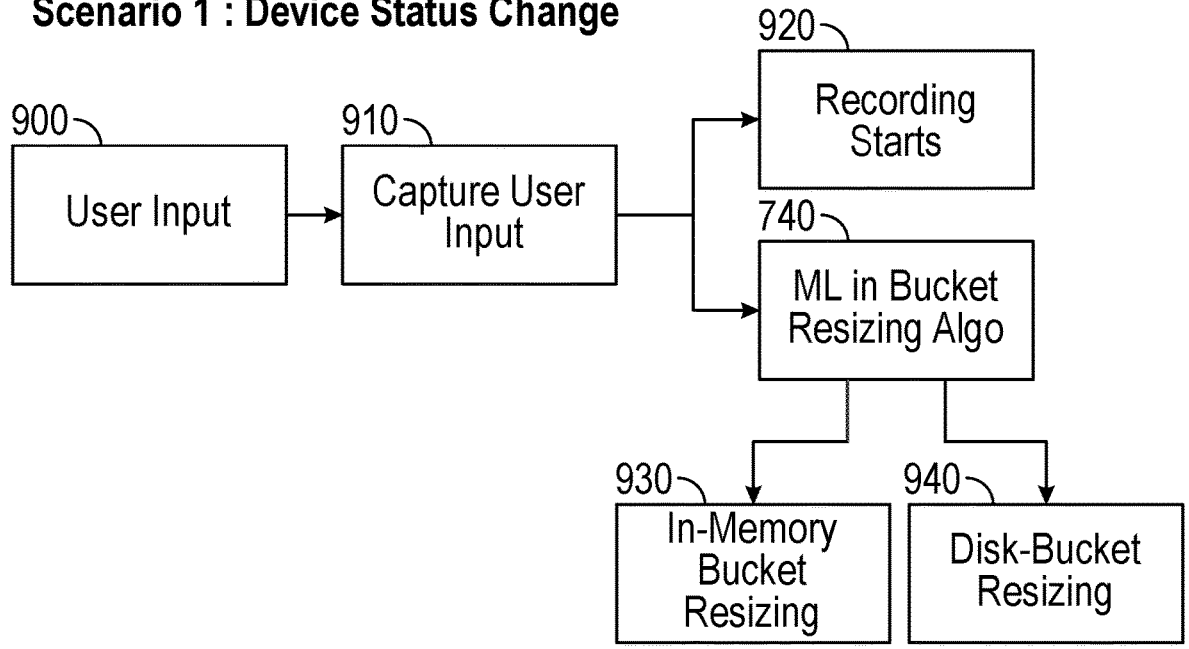
FIG. 9 illustrates a scenario for swapping ML models based on a change in the status of the electronic eyewear device.

In a first scenario, the ML model is updated as the electronic eyewear device 100 or 200 is detected to have changed state. FIG. 9 illustrates a scenario for swapping ML models based on a change in the status of the electronic eyewear device 100 or 200. In this example, the user may provide a user input by pressing a button on the electronic eyewear device 100 or 200 to initiate recording at 900. The button press is captured at 910, and the recording starts at 920. As the memory is used during the recording process, the cache resizing algorithm 740 may need to resize the size of the on-device ML model cache 470 at 930 or memory disk storage of the electronic eyewear device 100 or 200 at 940 to accommodate the recorded data. For example, the cache resizing algorithm 740 may evaluate whether the current free memory predicted for the in-memory recording size is less than the current free disk space. If not, an ML model file (e.g., LRU model file or lowest priority ML model file) may be unloaded to increase the available free disk space in accordance with the predicted recording file size, thereby resizing at least one of the in-memory size at 930 or the available free disk space at 940.

Figure 10:
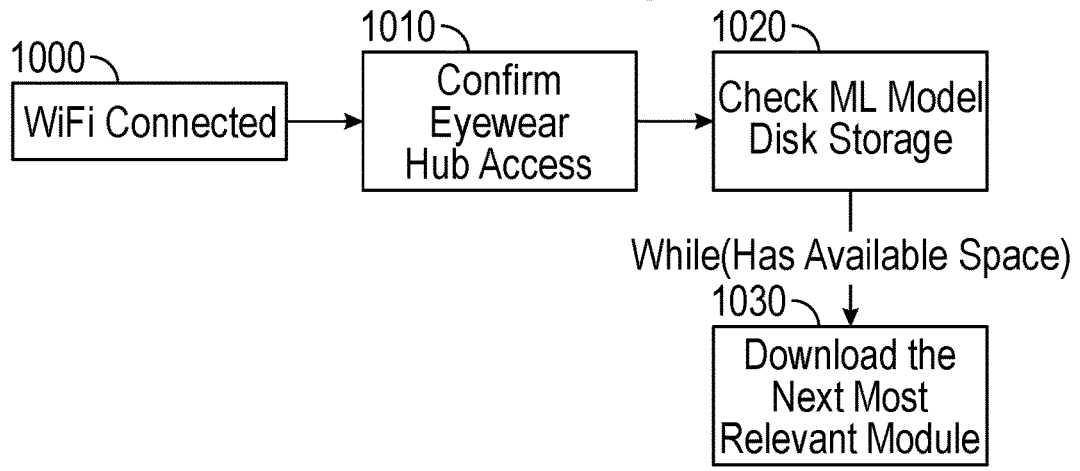
FIG. 10 illustrates a scenario for swapping ML models based on a change in the connection status of the electronic eyewear device.

In a second scenario, the ML model is updated as the connection status of the electronic eyewear device 100 or 200 is detected to have changed. FIG. 10 illustrates a scenario for swapping ML models based on a change in the connection status of the electronic eyewear device. In this example, if it is detected at 1000 that the electronic eyewear device 100 or 200 is connected to WI-FI®, then access to the ML model repository 480 on the backend server system 498 (e.g., SPECTACLES® backend service for SPECTACLES® device) is confirmed at 1010. The ML model disk storage is checked at 1020, and so long as sufficient disk storage space is available on the electronic eyewear device 100 or 200, the next most relevant ML model is downloaded to the electronic eyewear device 100 or 200 at 1030. Of course, in the absence of a WI-FI® or other connection to the Internet, such an update would not be possible.

Figure 11:
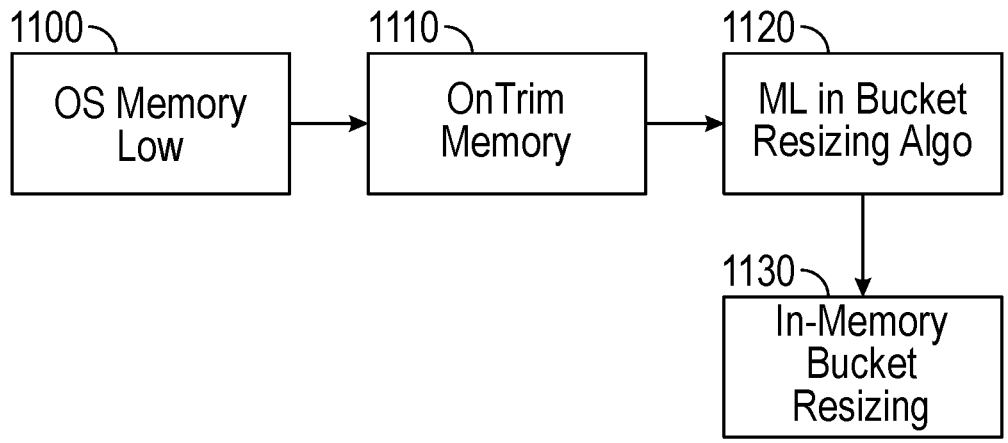
FIG. 11 illustrates a scenario for swapping ML models based on a change in the memory status of the electronic eyewear device.

In a third scenario, the ML model is updated as a result of a device status change indicating that the available memory is low. FIG. 11 illustrates a scenario for swapping ML models based on a change in the memory status of the electronic eyewear device 100 or 200 where the available operating system memory is determined to be low at 1100. A determination is made at 1110 about how much memory needs to be trimmed to accommodate the ML models, and the cache resizing algorithm 740 is invoked at 1120 as needed to resize the memory allocated to the ML models at 1130. For example, if the current free memory in the on-device model cache 470 is less than the predicted in-memory recording size, a least recently used (LRU) ML model or lowest priority ML model may be unloaded at 1130.

Figure 12:
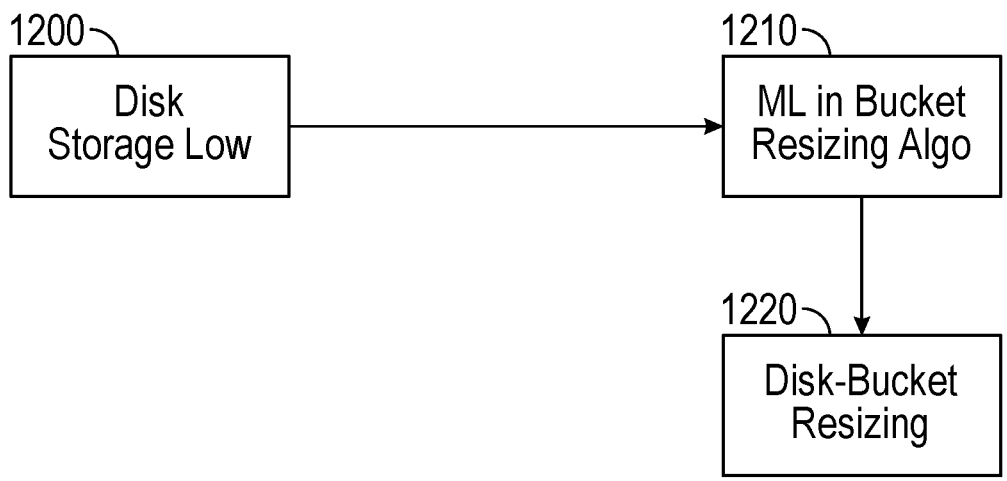
FIG. 12 illustrates a scenario for swapping ML models based on a change in the storage status of the electronic eyewear device.

In a fourth scenario, the ML model is updated as a result of a device status change indicating that the disk storage space of the electronic eyewear device 100 or 200 is low. FIG. 12 illustrates a scenario for swapping ML models based on a change in the storage status of the electronic eyewear device where the disk storage is determined to be low at 1200. The cache resizing algorithm 740 is invoked at 1210 as needed to resize the disk storage at 1220. For example, if the current free disk space of the electronic eyewear device 100 or 200 is less than the predicted in-memory recording size, a least recently used (LRU) ML model file or lowest priority ML model file may be unloaded at 1220.

Figure 13:
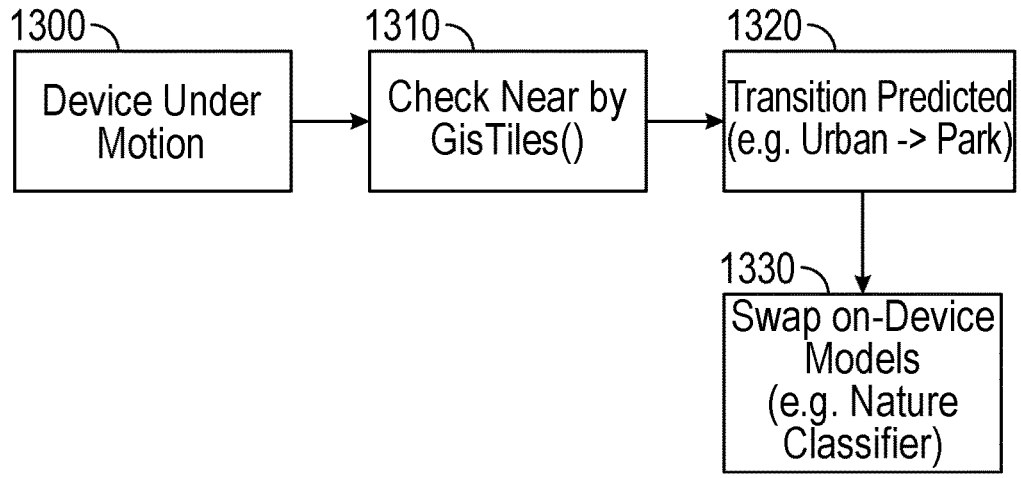
FIG. 13 illustrates ML model prediction based on geospatial proximity in a sample configuration.

In a fifth scenario, the sensors of at least one of the electronic eyewear device 100 or 200 or the mobile device 500 indicate that the electronic eyewear device 100 or 200 is in motion. In sample configurations, WI-FI® may be used to detect movement when the electronic eyewear device 100 or 200 is moved in an indoor environment, while GIS mapping data or GPS data may be used to detect movement when the electronic eyewear device 100 or 200 is moved in an outdoor or vehicle environment. FIG. 13 illustrates ML model prediction based on geospatial proximity in a sample configuration where the electronic eyewear device 100 or 200 is detected to be in motion at 1300. When motion is detected at 1300, the nearby GIS tiles are checked at 1310. If the nearby GIS tiles indicate at 1320 that a transition in location is to be expected (e.g., from an urban area to a park or from indoors to outdoors), then the ML models are updated to reflect the new environment at 1330. For example, the ML models in the on-device model cache 470 may be updated to reflect the new location. In the case of the movement from an urban area to a park, a nature classifier ML model may be swapped into the on-device model cache 470 in place of an ML classifier that is primarily used in an urban area. On the other hand, in the case of movement from indoors to outdoors, the ML models may be updated to support sporting activities or to remove ML models that are only useful indoors in order to free up memory for more useful ML models for outdoor activities.

Figure 14:
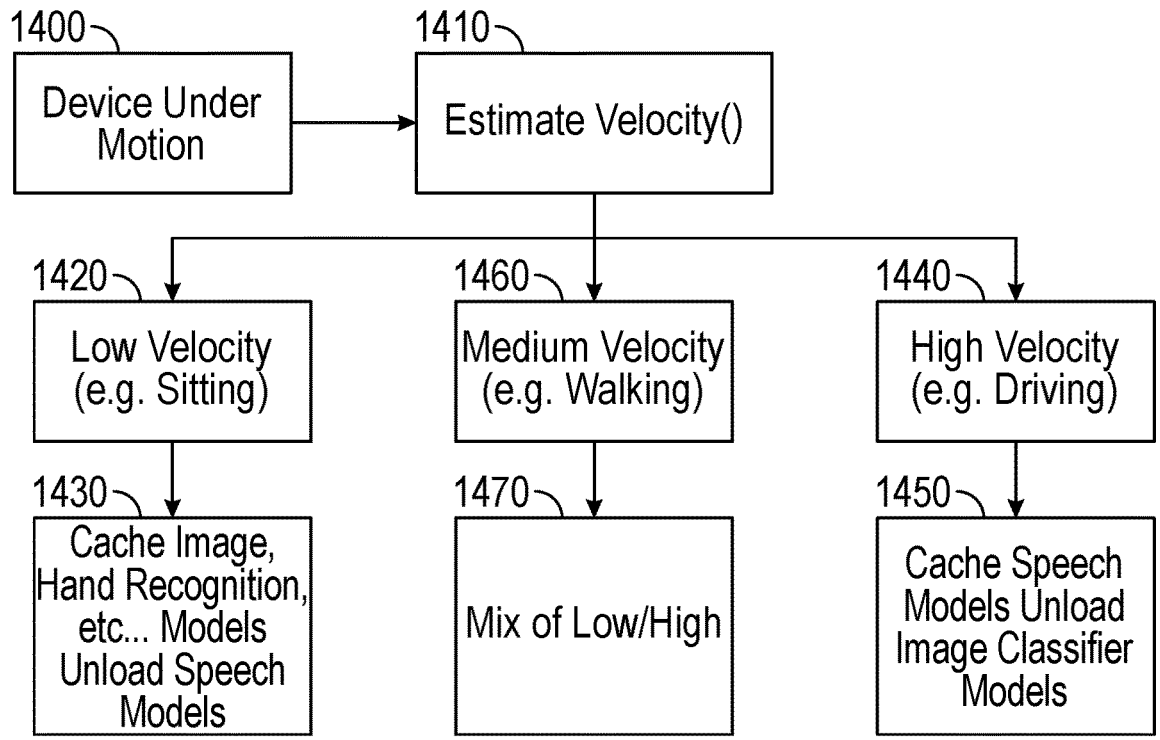
FIG. 14 illustrates ML model prediction based on user behavior.

In a sixth scenario, the sensors of at least one of the electronic eyewear device 100 or 200 or the mobile device 500 indicate that the electronic eyewear device 100 or 200 is in motion. FIG. 14 illustrates ML model prediction based on user behavior. In this scenario, when the electronic eyewear device 100 or 200 is detected at 1400 to be in motion, the velocity is estimated at 1410 to categorize the motion. For example, a low velocity may be correlated at 1420 to sedentary activities such as sitting. The appropriate ML models for sedentary activities may be loaded into the on-device model cache 470 at 1430. Such ML models may include image or hand gesture recognition models. Speech models may be unloaded to make room for such models. On the other hand, a high velocity may be correlated at 1440 to activities such as driving or riding in a vehicle. The appropriate ML models for such activities (e.g., speech models) may be loaded into the on-device model cache 470 at 1450 and the classifier models unloaded to make room for such models. On the other hand, a medium velocity may be correlated to an activity such as walking at 1460, and an appropriate mixture of the high velocity and low velocity models may be loaded as appropriate for such activities at 1470.

It will be appreciated that the ML models stored in the ML model repository 480 may be characterized using ranking models that assign metadata to describe the models as to the appropriateness of the respective models for different scenarios in which the electronic eyewear device may be used. The backend server system 498 may map the available functions/services of the electronic eyewear device 100 or 200 to the available ML models and assign the metadata accordingly. The rankings may reflect the proximity of a feature, the type of expected activities, geographic location, and the like. Sample categories may include different types of image classifiers, different types of health monitoring ML models, geographic data based on proximity by city/country or by mountain versus ocean environment, physical activity versus sedentary activity, use of hand-tracking or gesture detection for user input, use of sign language for the particular environment (which may change by location), and the like. The ML models also may be updated as the electronic eyewear device 100 or 200 is used in different countries or regions with different languages or customs. For example, when the user travels to another country, the sign language ML model and ML model for translating text to voice would automatically be updated upon detection of the new country from a Global Navigation Satellite System (GNSS) or from GIS data.

Of course, many other scenarios are possible within the scope and context of the present disclosure. In each case, the ML models may be loaded/unloaded proactively based on perceived user intent (as determined by motion sensors, device change of state, GIS data, and the like) to best prepare the user of the electronic eyewear device 100 or 200 for use of the electronic eyewear device 100 or 200 for durations of time where no Internet connection is available. The measured activity may be used to predict how the user is likely to use the electronic eyewear device 100 or 200 (e.g., based not only on location and movement but also by what is already visible on the electronic eyewear device 100 or 200) to avoid the delay in downloading an ML model as needed or the failure to obtain a needed model because an Internet connection is currently unavailable. For example, if the user does not use object recognition ML models, then such ML models may be removed in favor of ML models that the user accesses more frequently.

As another alternative, the on-device model cache 470 may store a coarse ML model and download and install a finer ML model that is appropriate for the dataset before or while the coarse ML model is being used. However, an initial coarse model followed by a more appropriate model may add latency (e.g., optical character recognition (OCR) followed by language detection). The downloaded ML model may be compressed or portions of the ML model may be extracted based on on-the-fly predictive loading to optimize the available ML model(s). In the configurations described herein, such optimizations are based on the use cases determined by the sensors of the electronic eyewear device 100 or 200. Such optimization is particularly desirable in the case of an electronic eyewear device 100 or 200 as significant latency is a particular problem for such a device where real-time responses are particularly important for object identification and other services that may use ML models.

As yet another alternative, for continual machine learning, user data may be stored in order to adapt the model to new inputs (i.e., learn). To protect privacy, the user data is typically kept on-device. Therefore, a method is also provided to detect when someone new is using the device to both protect privacy and to ensure that the model is "reset"

for the new user to avoid decreasing accuracy. Also, the ML models specific to respective users may be stored in the ML Model Repository 480 by user and downloaded upon detection of which user is wearing the electronic eyewear device 100 or 200.

Figure 15:
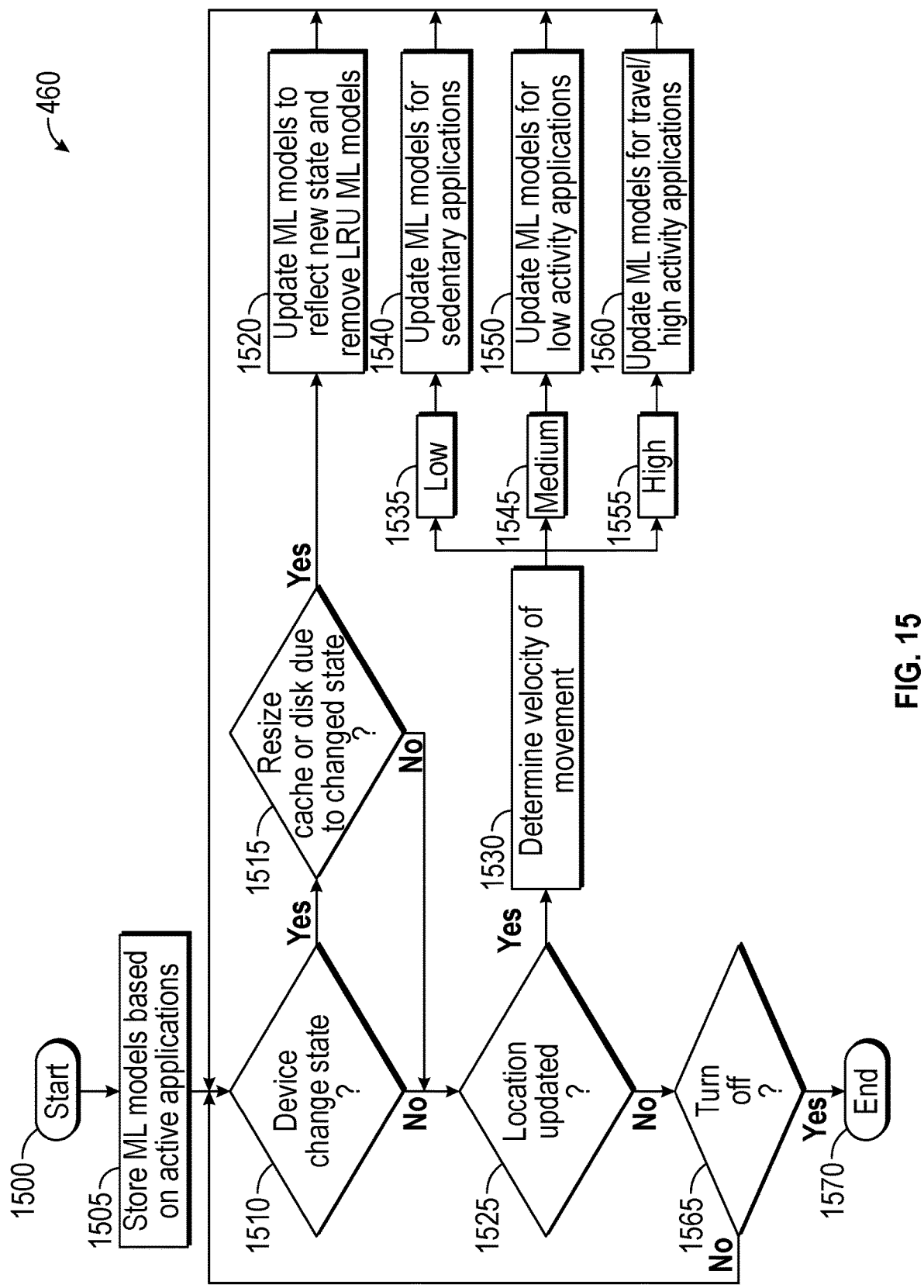
FIG. 15 illustrates a flow chart for managing ML models on an electronic eyewear device in a sample configuration.

FIG. 15 illustrates a flow chart of the ML model management process 460 for managing ML models on an electronic eyewear device 100 or 200 in a sample configuration. As illustrated, the ML model management process 460 starts at 1500 and stores the ML models from the ML model repository 480 into the ML model cache 470 or to the system memory 434 at 1505 based on which applications are active or available to the electronic eyewear device. Default applications may include scanning, hand gestures, and the like. The ML model management process 460 further processes sensor inputs from the electronic eyewear device 100 or 200 to constantly monitor for a change in the device state at 1510. If a change in device state is detected, the ML model management process 460 further determines at 1515 whether the device state change has caused or is expected to require the ML model cache 470 or system memory 434 to be resized to accommodate the change. If so, the ML models are updated at 1520 to reflect the new device state and the change in available memory. As necessary, least recently used (LRU) or low priority ML models may be unloaded to make room for new models at 1520 and the process repeats. Otherwise, the ML model management process 460 checks at 1525 whether the location of the electronic eyewear device 100 or 200 has been updated.

If the location of the electronic eyewear device 100 or 200 has been updated at 1525, the ML models may be updated to reflect a change in environment (e.g., from indoors to outdoors, from urban area to park, etc.). In addition, the velocity of movement of the electronic eyewear device 100 or 200 may be determined at 1530. If the velocity is determined to be low at 1535, the ML models are updated to reflect sedentary applications at 1540. As noted above, such sedentary applications may include gesturing models and the like. Speech models may be unloaded to make room for such ML models.

On the other hand, if the velocity is determined to be medium at 1545, the ML models are updated to reflect low activity applications at 1550. As noted above, such medium activity applications may include a combination of low activity and high activity applications.

If the velocity is determined to be high at 1555, the ML models are updated to reflect at least one of travel or high activity applications (e.g., jogging, exercise, etc.) at 1560. As noted above, such travel or high activity applications may include speech models for accepting speech inputs and the like. Image classifier models may be unloaded to make room for such ML models.

The process may repeat until the electronic eyewear device 100 or 200 is powered down at 1565 or enters a sleep mode. The process then ends at 1570.

It will be appreciated that ML models may need to be unloaded on an ongoing basis while recording if the memory is needed to store the recordings. In such case, the ML models are unloaded from lowest rated to highest rated, based on least recently used to most recently used, and the like.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. An unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on a head of a user, comprising:
   at least one memory that stores at least one machine learning (ML) model and instructions; and a processor that executes the instructions to manage loading and unloading of the at least one ML model into the memory by performing operations including:
  detecting whether the electronic eyewear device has moved, is predicted to move, or whether the electronic eyewear device has changed state or resource availability;
  when the electronic eyewear device has moved or is predicted to move, the processor receiving for processing at least one new ML model based on at least one of updated location information or observable visual information;
  when the electronic eyewear device has changed state or resource availability, determining whether the at least one memory needs to be resized to accommodate any ML models needed for the changed state or changed resource availability; and
  when the at least one memory needs to be resized to accommodate any ML models needed for the changed state or changed resource availability, at least one of unloading at least one ML model from the at least one memory or the processor receiving for processing a new ML model based on at least one of the changed state or changed resource availability and a processing priority established for the new ML model.

2. The electronic eyewear device of claim 1, wherein the at least one memory comprises at least a variable size memory in which an ML model is loaded for processing by the processor and an ML model cache that stores at least one currently active or inactive ML model based on surroundings of the electronic eyewear device and likely actions of the user.

3. The electronic eyewear device of claim 2, wherein the at least one currently active or inactive ML model is stored in the ML model cache on a priority basis in accordance with processing priorities of the at least one ML model with respect to respective currently active or inactive ML models.

4. The electronic eyewear device of claim 2, further comprising wireless communications circuitry that communicates with a server including an ML model repository that stores respective ML models having metadata assigned based on rankings that describe appropriateness of the respective ML models for different scenarios in which the electronic eyewear device may be used.

5. The electronic eyewear device of claim 4, wherein the rankings reflect at least one of proximity of a feature to the user, a type of expected activity by the user, or the user's geographic location.

6. The electronic eyewear device of claim 5, wherein categories of the rankings include at least one of type of image classifier model, type of health monitoring model, geographic location, level of physical activity, or type of user input.

7. The electronic eyewear device of claim 1, wherein the processor executing instructions to detect whether the electronic eyewear device has moved or is predicted to move includes the processor executing instructions to collect at least one of geospatial information relating to the user's surroundings and the user's predicted behavior or images of the user's surroundings, and the processor receiving for processing at least one ML model that reduces computation resources while maintaining accuracy while the electronic eyewear device is used in the user's surroundings for the user's predicted behavior.

8. The electronic eyewear device of claim 1, wherein the processor executing the instructions causes the processor to perform additional operations including at least one of compressing the new ML model or implementing on-demand predictive loading to extract portions of the new ML model to optimize availability of the new ML model with reduced latency.

9. The electronic eyewear device of claim 1, wherein the processor executing the instructions causes the processor to perform additional operations including determining which user is using the electronic eyewear device and downloading at least one ML model specific to the determined user.

10. A method of managing loading and unloading of at least one machine learning (ML) model into memory of an electronic eyewear device, including:
  storing at least one ML model into an ML model cache or system memory of the electronic eyewear device based on which applications are active or available to the electronic eyewear device;
  processing sensor inputs from the electronic eyewear device to detect whether the electronic eyewear device has moved, is predicted to move, or whether the electronic eyewear device has changed state or resource availability;
  when the electronic eyewear device has moved or is predicted to move, receiving for processing at least one new ML model based on at least one of updated location information or observable visual information;
  when the electronic eyewear device has changed state or resource availability, determining whether the ML model cache or system memory needs to be resized to accommodate any ML models needed for the changed state or changed resource availability; and
  when the ML model cache or system memory needs to be resized to accommodate the state change, updating the at least one ML model stored in the ML model cache or system memory to reflect a new device state and a change in available memory by at least one of unloading the at least one ML model from the ML model cache or system memory or a processor receiving for processing a new ML model based on at least one of the changed state or changed resource availability and a processing priority established for the new ML model.

11. The method of claim 10, further including measuring a velocity of movement of the electronic eyewear device and at least one of assigning one or more ML models to the electronic eyewear device or unloading one or more ML models from the electronic eyewear device based on the measured velocity of movement.

12. The method of claim 11, wherein storing at least one ML model into the ML model cache or system memory of the electronic eyewear device comprises storing the at least one ML model in the ML model cache or system memory based on surroundings of the electronic eyewear device and likely actions of a user.

13. The method of claim 11, wherein storing at least one ML model into the ML model cache or system memory of the electronic eyewear device comprises storing the at least one ML model in the ML model cache or system memory on a priority basis in accordance with processing priorities of the at least one ML model with respect to previously stored ML models.

14. The method of claim 11, further comprising downloading the at least one ML model from a server comprising an ML model repository that stores ML models having metadata assigned based on rankings that describe appropriateness of the respective ML models for different scenarios in which the electronic eyewear device may be used.

15. The method of claim 11, wherein processing sensor inputs from the electronic eyewear device to detect whether the electronic eyewear device has moved or is predicted to move comprises collecting at least one of geospatial information relating to the user's surroundings and the user's predicted behavior or images of the user's surroundings, and loading into the ML model cache or system memory at least one ML model that reduces computation resources while maintaining accuracy while the electronic eyewear device is used in the user's surroundings for the user's predicted behavior.

16. The method of claim 11, further comprising at least one of compressing the new ML model or implementing on-demand predictive loading to extract portions of the new ML model to optimize availability of the new ML model with reduced latency.

17. The method of claim 11, further comprising determining which user is using the electronic eyewear device and loading into the ML model cache or system memory at least one ML model specific to the determined user.

18. A non-transitory computer-readable storage medium that stores instructions that when executed by at least one processor cause the at least one processor to manage loading and unloading of at least one machine learning (ML) model into memory of an electronic eyewear device by performing operations including:

storing at least one ML model into an ML model cache or system memory of the electronic eyewear device based on which applications are active or available to the electronic eyewear device;

processing sensor inputs from the electronic eyewear device to detect whether the electronic eyewear device has moved, is predicted to move, or whether the electronic eyewear device has changed state or resource availability;

when the electronic eyewear device has moved or is predicted to move, the processor receiving for processing at least one new ML model based on at least one of updated location information or observable visual information;

when the electronic eyewear device has changed state or resource availability, determining whether the ML model cache or system memory needs to be resized to accommodate any ML models needed for the changed state or changed resource availability; and when the ML model cache or system memory needs to be resized to accommodate the state change, updating the at least one ML model stored in the ML model cache or system memory to reflect a new device state and a change in available memory by at least one of unloading the at least one ML model from the ML model cache or system memory or the processor receiving for processing a new ML model based on at least one of the changed state or changed resource availability and a processing priority established for the new ML model.

19. The storage medium of claim 18, further comprising instructions that when executed by the at least one processor cause the at least one processor to perform operations including downloading the at least one ML model from a server comprising an ML model repository that stores ML models having metadata assigned based on rankings that describe appropriateness of the respective ML models for different scenarios in which the electronic eyewear device may be used.

20. The storage medium of claim 18, further comprising instructions that when executed by the at least one processor cause the at least one processor to perform operations including collecting at least one of geospatial information relating to the user's surroundings and the user's predicted behavior or images of the user's surroundings, and loading into the ML model cache or system memory at least one ML model that reduces computation resources while maintaining accuracy while the electronic eyewear device is used in the user's surroundings for the user's predicted behavior.

* * * * *